United States Patent
Straetmans et al.

(10) Patent No.: US 12,429,182 B2
(45) Date of Patent: Sep. 30, 2025

(54) ADDRESSABLE LED RETROFIT FOR VEHICLE LIGHT

(71) Applicant: LUMILEDS LLC, San Jose, CA (US)

(72) Inventors: Jean-Sebastien Straetmans, Aachen (DE); Gennadi Tochadse, Aachen-Eilendorf (DE); Benno Spinger, Aachen (DE); Norbert Alois Lesch, Vaals (NL); Josef Andreas Schug, Würselen (DE)

(73) Assignee: LUMILEDS LLC, San Jose, CA (US)

( * ) Notice: Subject to any disclaimer, the term of this patent is extended or adjusted under 35 U.S.C. 154(b) by 0 days.

(21) Appl. No.: 17/959,075

(22) Filed: Oct. 3, 2022

(65) Prior Publication Data
US 2023/0109084 A1    Apr. 6, 2023

Related U.S. Application Data

(60) Provisional application No. 63/251,237, filed on Oct. 1, 2021.

(51) Int. Cl.
| | | |
|---|---|---|
| *F21S 41/147* | (2018.01) | |
| *F21K 9/237* | (2016.01) | |
| *F21W 102/13* | (2018.01) | |
| *H05B 45/357* | (2020.01) | |

(52) U.S. Cl.
CPC ............ *F21S 41/147* (2018.01); *F21K 9/237* (2016.08); *H05B 45/357* (2020.01); *F21W 2102/13* (2018.01)

(58) Field of Classification Search
CPC ....... H05B 45/357; F21S 41/147; F21K 9/237
See application file for complete search history.

(56) References Cited

U.S. PATENT DOCUMENTS

| | | | |
|---|---|---|---|
| 2009/0279316 A1* | 11/2009 | Hikmet | F21S 41/645 |
| | | | 362/465 |
| 2019/0110348 A1 | 4/2019 | Feil et al. | |
| 2019/0198727 A1 | 6/2019 | Shen et al. | |
| 2020/0079278 A1 | 3/2020 | Bonne et al. | |
| 2021/0156536 A1* | 5/2021 | Adams | B60Q 1/143 |

OTHER PUBLICATIONS

International Search Report and Written Opinion for PCT International Application No. PCT/US2022/045574 mailed on Jan. 18, 2023.

(Continued)

*Primary Examiner* — Thomas M Sember
(74) *Attorney, Agent, or Firm* — DAY PITNEY LLP; Richard B. Emmons; Anthony A. Kassas (57) ABSTRACT

An LED retrofit lamp is described. The LED retrofit lamp includes LEDs arranged into at least a first group of LEDs and a second group of LEDs, power contacts, an interface and a controller. The power contacts receive electrical power to operate the LEDs. The interface supplies control signals to operate one or more of the first group and the second group of LEDs. The controller receives the control signals and operates the first group of LEDs and the second group of LEDs independent from each other based on the received control signals.

19 Claims, 8 Drawing Sheets

(56) References Cited

OTHER PUBLICATIONS

Xkglow, "LED Dome Light Bulb Kit | Xkchrome Smartphone App Controlled," https://store.xkglow.com/catalog/product/car-truck/led-dome-light-bulb-kit-xkchrome-smartphone-app-controlled/ , Available at: https://web.archive.org/web/20210921055732/https://store.xkglow.com/catalog/product/car-truck/led-dome-light-bulb-kit-xkchrome-smartphone-app-controlled/ (Sep. 21, 2021).
Wright, "Samsung announces PixCell LED for adaptive drive beam auto headlamps," LEDs Magazine (Apr. 21, 2021).
IPF, "LED Dual Color Fog Light Bulb," https://www.ipf.co.jp/products/5xdfbl.html , Available at: https://web.archive.org/web/20210922150127/https://www.jpf.co.jp/products/5xdfbl.html (Sep. 22, 2021).

* cited by examiner

ADDRESSABLE LED RETROFIT FOR VEHICLE LIGHT

CROSS REFERENCE TO RELATED APPLICATIONS

This application claims the benefit of U.S. Provisional Patent Application No. 63/251,237, which was filed on Oct. 1, 2021, the contents of which are hereby incorporated by reference herein.

BACKGROUND

Light emitting diodes (LEDs) more and more replace older technology light sources, such as halogen, gas-discharge, and Xenon lamps (also referred to herein collectively as conventional lamps) due to superior technical properties, such in terms of energy efficiency and lifetime. This is true as much for demanding applications as less demanding applications, such as in terms of luminance, luminosity, and/or beam shaping, such as used in vehicle headlighting. Considering the vast installation base of conventional lamps, providing so-called LED retrofit lamps (also referred to herein as LED retrofits for short) more or less one-to-one replacing conventional lamps while allowing continued use of other system components, such as optics (e.g., reflectors and/or lenses) and luminaires, may also be of great economic interest.

SUMMARY

An LED retrofit lamp is described. The LED retrofit lamp includes LEDs arranged into at least a first group of LEDs and a second group of LEDs, power contacts, an interface and a controller. The power contacts receive electrical power to operate the LEDs. The interface supplies control signals to operate one or more of the first group and the second group of LEDs. The controller receives the control signals and operates the first group of LEDs and the second group of LEDs independent from each other based on the received control signals.

BRIEF DESCRIPTION OF THE DRAWINGS

A more detailed understanding can be had from the following description, given by way of example in conjunction with the accompanying drawings wherein.

DETAILED DESCRIPTION

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

For many car types, LED retrofits are on the market legally replacing the original conventional lamps with superior light technical properties, such as brighter light and/or more bluish light, enhanced lifetime, and/or reduced energy consumption. However, functionally, the LED retrofits may only offer a one-to-one replacement for the original conventional lamps. For vehicle headlights with an LED retrofit, the functionality of the lights is still limited to the functionality provided by the original, non-LED headlights, such as high and low beam, fog light, etc. Compared to modern new cars, this means that, even with an LED retrofit, beam shape control capabilities provided by modern ADB headlights, such as cornering light, matrix light, etc., are still missing.

Such restrictions appear mandatory as, with LED retrofitting, one replaces only a former light source with another new light source and, thus, the functionality of the LED retrofit lamp may still be limited to the functionality of single, functionally equivalent light source. The vehicle driver may, thus, be restricted to the mere capability of switching on and off the replaced light source.

Figure 1:
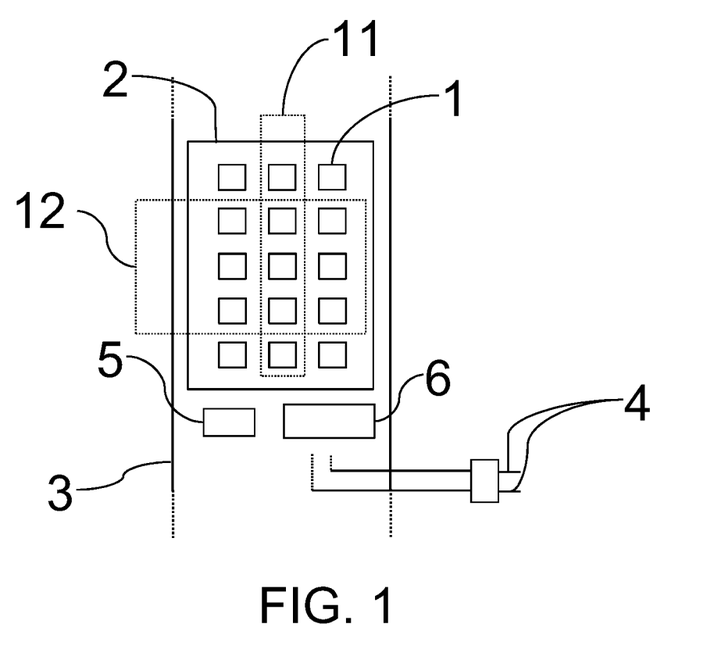
FIG. 1 is a schematic plan section view of an example LED retrofit lamp.

FIG. 1 is a schematic plan section view of an example LED retrofit lamp. In the example illustrated in FIG. 1, LEDs 1 are arranged in a 5×3 array. In other words, after installation in the vehicle, the LEDs 1 are arranged in 5 horizontal rows of 3 LEDs each (or 3 vertical columns) in an LED mounting area 2. The LEDs 1 may be grouped in two LED groups 11 and 12. In the illustrated example, the two LED groups 11 and 12 overlap in the three middle LEDs. The figure further shows a body 3 and power contacts 4 of the LED retrofit. The dashed lines indicate a (not shown) potential continuation of the elements. The boxes 5 and 6 schematically indicate a controller 5 and a radio interface 6.

In an LED retrofit for a vehicle headlight, LEDs may be mounted on two opposite sides of a planar carrier. FIG. 1 shows a schematic plan view of the arrangement of the LEDs 1 on one of these opposite sides only. The other side (not shown) may carry a mirrored arrangement of further LEDs 1. The controller 5 and the radio interface 6 may exist only once and may be inside the body 3 and, thus, in FIG. 1 they are schematically shown in a sectional view. In some embodiments, various controllers may be involved in controlling LEDs 1, including controllers that are part of the lighting module itself and controllers that are external to the controller, such as controllers that are part of the vehicle itself, controllers that are part of a phone or computer application, etc.

While a 5×3 array of LEDs is illustrated in FIG. 1, the embodiments described herein are not limited to the illustrated array on two opposite sides of a planar carrier. Additionally or alternatively, the LEDs 1 may be arranged in any other scheme, such as a 6×1 array. Instead of a planar carrier with two opposite sides, other shapes are within the scope of the embodiments described herein as well, such as two sides angled versus each other (e.g., at an angle other than being opposite to each other at 180°) or prisms with three, four, or more sides including equal or different angles with each other. Particular shapes may be selected to either more closely mimic the 360° emission pattern of a conventional lamp or to adapt to particular properties of the vehicle light optics. The sides of the carrier need not be planar but may be curved.

Figure 2A:
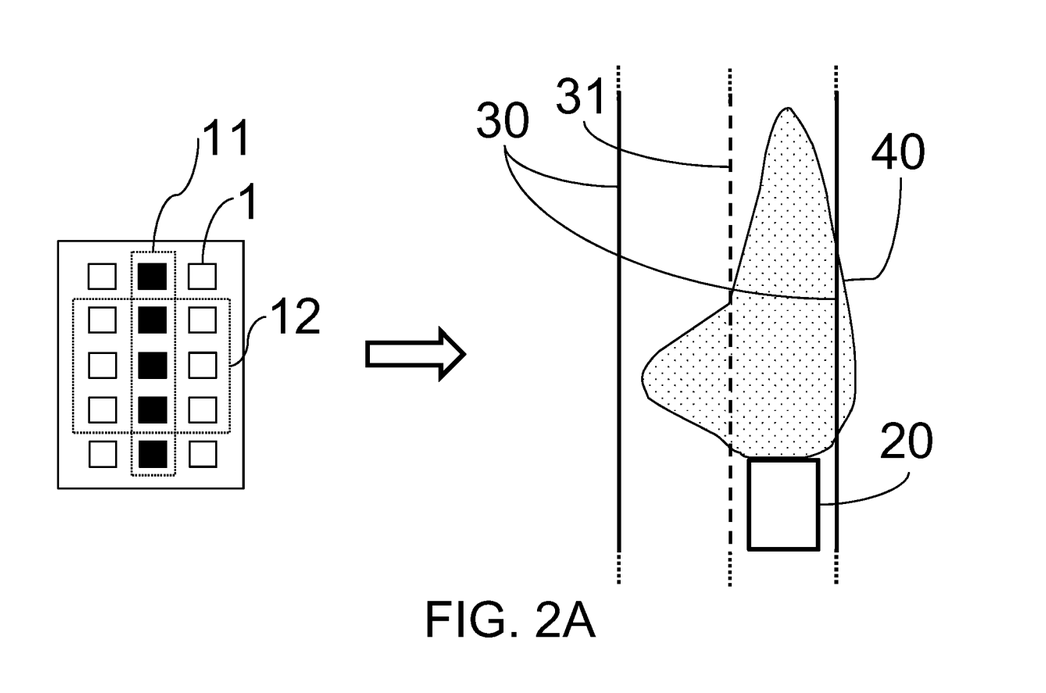
FIG. 2A and FIG. 2B are schematic views of examples of LED group activations and resulting beam patterns for the LED retrofit lamp of FIG. 1.
Figure 2B:
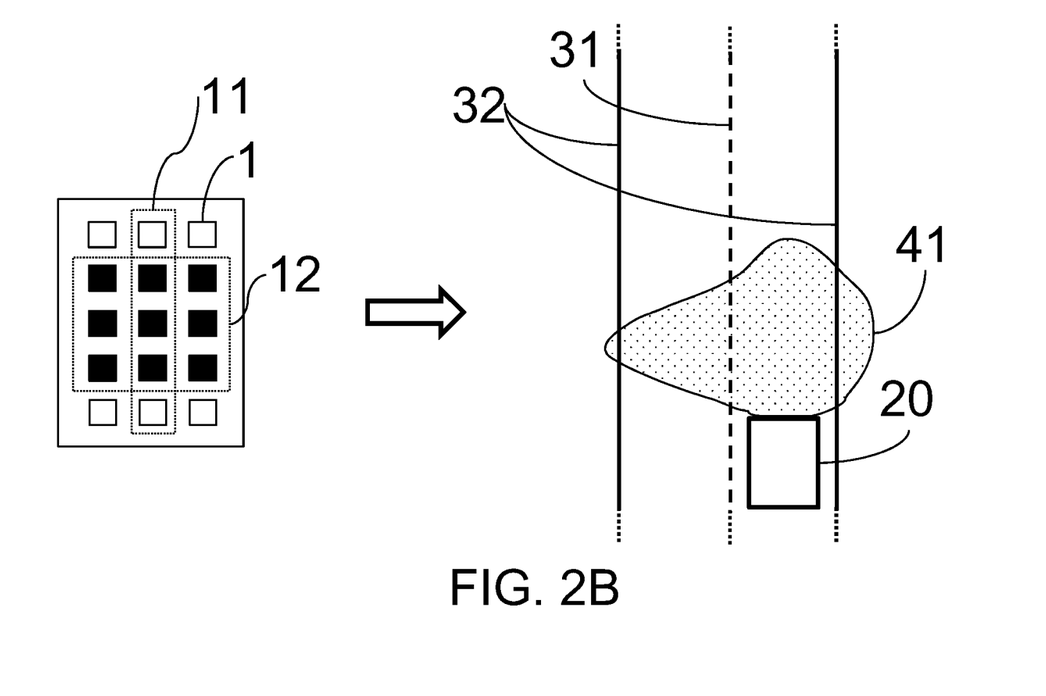

FIG. 2A and FIG. 2B are schematic views of examples of LED group activations and resulting beam patterns for the LED retrofit lamp of FIG. 1. The examples shown in FIGS. 2A and 2B may result from activating the LEDs 1 in the LED groups 11, 12. The left side of each of the Figures shows the LED group activation pattern, and the right side of each of the Figures shows, in a bird's eye view, the beam pattern 40, 41 resulting on a road that has borders 30 and a middle strip 31, in front of a vehicle 20 employing the LED retrofit of FIG. 1 in its low beam headlight. FIG. 2A shows a resulting relatively small beam, which is on the vehicle 20's own lane a very long beam 40, when only the LEDs 1 of the LED group 11 (the 5 LEDs 1 of the middle column of the 5×3 array) are activated. Such beam 40 may be particularly useful on motorways when the vehicle travels fast. Such a beam may, thus, be referred to as a motorway beam. FIG. 2B shows a resulting very broad beam, which is on the vehicle's own lane a short beam 41, when only the LEDs 1 of the LED group 12 (the middle three rows of the 5×3 array) are activated. Such beam might be particularly useful in cities when the vehicle travels slow and, thus, may be referred to as a city beam.

Motorway and city beams are just examples of beam shapes enabled by the LED retrofit of FIG. 1. Besides those examples, and besides the usual low and high beam functions, any other beam shape may be within the scope of the embodiments described herein. By way of example only, the following beams are envisaged: adverse weather beam, welcome beam, and country side beam. Furthermore, a beam shape may be customizable or even freely designable by the end user so long as the beam shape is legally permissible.

Embodiments described herein, thus, may enable provision of various beam patterns by arranging LEDs in LED groups and activating the groups independent from each other. In embodiments, the controller 5 may set the activation state of the LED groups 11, 12 independent of each other according to control signals given by, for example, the vehicle driver and received by an interface. The controller 5 and the interface may be integral parts of the LED retrofits described herein. The interface may be a radio interface 6, which may receive control signals via radio.

Figure 3:
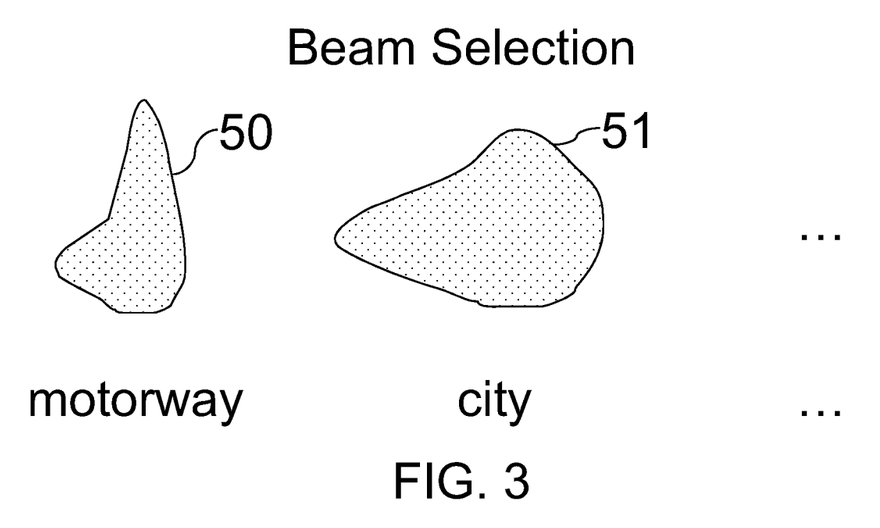
FIG. 3 is a schematic view of an example display screen of a smartphone application for controlling at least some of the functions of the LED retrofit lamp of FIG. 1.

FIG. 3 is a schematic view of an example display screen of a smartphone application for controlling at least some of the functions of the LED retrofit lamp of FIG. 1. The smartphone application may give the vehicle driver the possibility to select a desired beam pattern just by pressing on an icon 50, 51 of the beam patterns displayed on the smartphone screen. The " . . . " at the right side of FIG. 3 indicates that there may be more beam patterns to select from that are not shown in the Figure. The vehicle driver, with such a smartphone app, may use the standard vehicle light switches for switching the lights on and off for supplying power to the LED retrofit and may use the smartphone app (for example after putting the smartphone in a legally allowed holder) to touch and select a beam pattern icon 50, 51. The controller 5, after having received via the radio interface 6 the control signals generated by the smartphone app, may select to turn on the associated one of the LED groups 11, 12 to provide the desired beam pattern 40, 41.

Instead of a radio interface or any other additional communication channel between the vehicle driver and the LED retrofit, the standard vehicle light switches may be used by employing switching sequences. For example, the interface of the LED retrofit may be or include the power contacts 4, and the controller 5 may react based on the power on/off sequences applied to the power contacts 4.

For example, an LED retrofit may always switch on in a default pattern, such as the city beam 41. Then, after a pause after switch-on, a rapid sequence of switching off and on again may toggle the beam pattern, for example from city beam 41 to motorway beam 40 and back and forth. Alternatively, instead of switching on (after a longer off) in the city beam 41 as a default, the LED retrofit may memorize its last activation pattern before switch-off and may switch on again in such memorized activation pattern. For example, after switching off in the motorway beam 40, switching on again (after a pause) would start the retrofit in the memorized motorway beam 40.

Using the power contacts 4 as an interface for an LED retrofit may be desirable for a vehicle driver when retrofitting a dual-function lamp where the vehicle driver is used to toggling between the two functions by an easily operable toggling switch. An example of this may be an LED retrofit replacing an H4 halogen lamp for high and low beam. Such LED retrofit, for example, could be offered with four functions, such as city beam, low beam, high beam, and motorway beam. The lamp may be switched on by flipping the headlight power switch, as previously done with the H4, in low beam. Then, each operation of the toggling switch could move the LED retrofit through the sequence of the four functions: low beam→high beam→motorway beam→city beam→low beam→ . . . . This usage may be familiar to the driver, just adding two additional beam patterns, city and motorway beam, to the previous two patterns, low and high beam.

Using the switches that are already present in the vehicle lights to signal a change in headlight functionality may avoid the necessity for any additional equipment. On the other hand, using, for example, a smartphone application, in conjunction with the radio interface 6 and the controller 5 of the LED retrofit of FIG. 1, may allow more complex user interaction. For example, using a smartphone application for control may enable many different beam patterns to be offered for selection. Additionally, or alternatively, instead of just switching on and off, intermediate power levels (dimming) may be offered. Customizable or user modifiable beam patterns may also be within the scope of the embodiments described herein so long as such patterns comply with legal requirements. The driver could, for example, broaden a beam pattern 40, 41 by, for example, spreading his or her thumb and forefinger on the beam pattern icon 50, 51 on a touch screen display of the smartphone. The LED retrofit may implement such broadening command by, for example, activating, additionally to the already operating LEDs, an LED group with LEDs horizontally neighboring the previously activated ones.

Figure 4A:
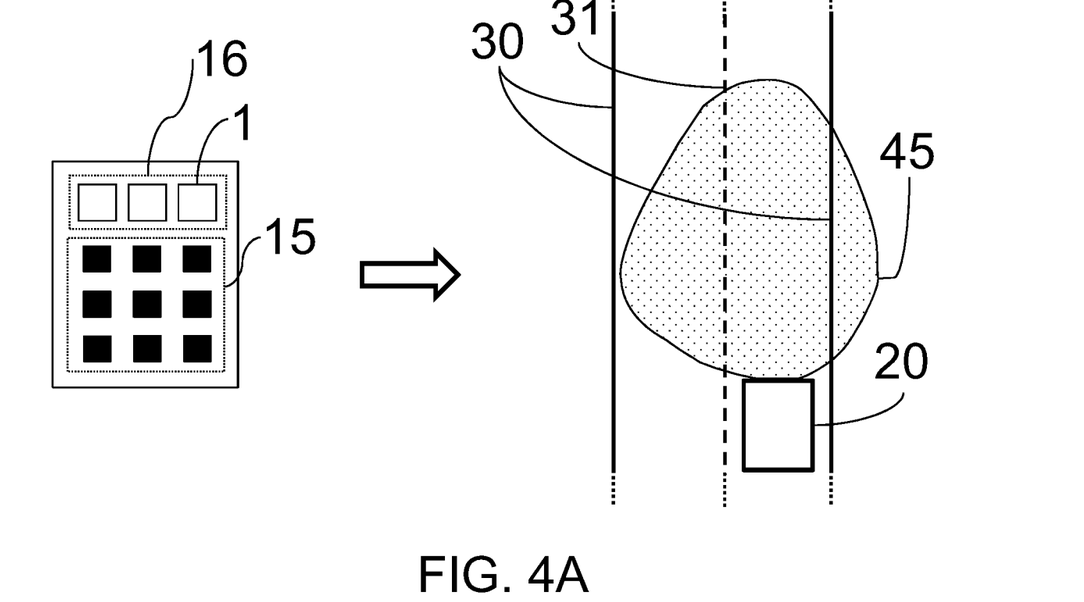
FIG. 4A and FIG. 4B are schematic views showing LED group activations and resulting beam patterns of another example LED retrofit lamp.
Figure 4B:
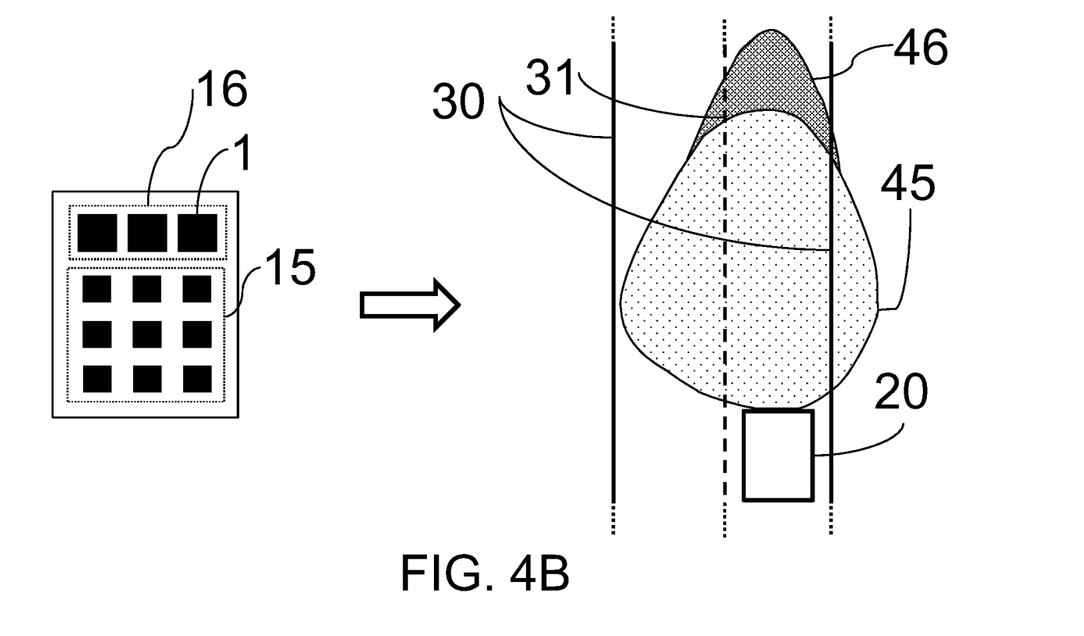

FIG. 4A and FIG. 4B are schematic views showing LED group activations and resulting beam patterns of another example LED retrofit lamp. The illustration in FIG. 4A and FIG. 4A follows the same presentation as FIG. 2. Shown are two disjunct LED groups 15, 16 with their resulting beam patterns 45, 46 in bird's eye view. In the examples illustrated in FIG. 4A and FIG. 4B, the beam patterns relate to a vehicle high beam. Activating only the LEDs 1 of the LED group 15 may result in a standard high beam pattern 45. Activating, in addition to the LEDs 1 of the group 15, of the LEDs 1 of the LED group 16, may add, as a high beam extension, a very long range beam pattern 46. For increasing the flux and/or the intensity in such very long range component 46, the LEDs 1 in the LED group 16 may be chosen to be more powerful than the LEDs 1 in the LED group 15. For example, they may have a larger light emitting area and/or a higher luminance. In some embodiments, the LEDs of the LED group 16 may have a luminance of greater than 100 Mcd/m$^2$. This is indicated in the Figures by showing the LEDs of the LED group 16 having with a larger surface area than the LEDs of the LED group 15.

While FIG. 4A and FIG. 4B show the LEDs 1 of the two LED groups 15, 16 differing in power, light emitting area, and/or luminance, any other combination of LEDs 1 in various LED groups also belong to the scope of the embodiments described herein. For example, the LEDs 1 and their arrangement in the LED groups may differ in one or more of: color of light emitted by the LEDs 1, contrast generated by neighboring LEDs 1, special arrangement of LEDs 1 (distance between LEDs, arrangement patterns like rectangular arrays or concentric circles, etc.), and position of LEDs 1 relative to the optical system processing the light emitted by the LEDs 1, such as the position of the LEDs 1 relative to the focal areas and points of the optical system.

Figure 5A:
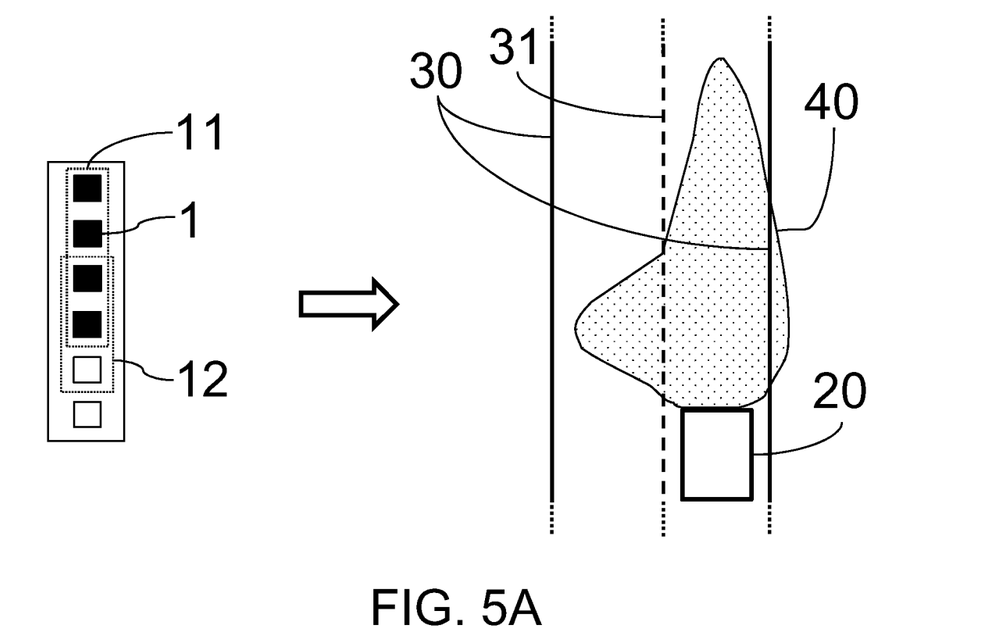
FIG. 5A and FIG. 5B are schematic views showing LED group activations and resulting beam patterns of still another example LED retrofit lamp.
Figure 5B:
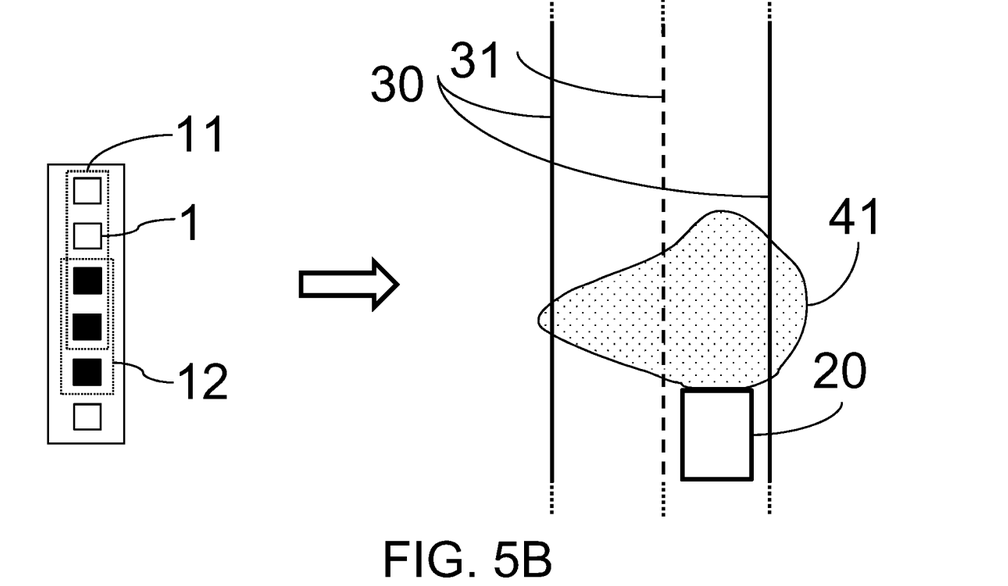

FIG. 5A and FIG. 5B are schematic views showing LED group activations and resulting beam patterns of still another example LED retrofit lamp. The illustration is analogous to the one in FIG. 2, and the resulting beam patterns of a motorway beam 40 and a city beam 41 may be similar to the ones in FIG. 2. In the examples illustrated in FIG. 5A and FIG. 5B, the LEDs 1 are arranged in an array of 6 rows and 1 column. Thus, the array, or more precisely, the light emitting areas of the LEDs 1, may form a narrow long rectangle of relatively uniform luminance when selecting LEDs 1 allowing close spacing of their light emitting areas.

Such arrangement may allow mimicking the light emitting area of the light source of a conventional lamp the LED retrofit is meant to replace in a vehicle light. For example, when the LED retrofit is inserted into the vehicle light in place of the conventional lamp, such as a halogen lamp, the 6×1 array may occupy the same space as formerly the light source of the conventional lamp (e.g., the filament of a halogen lamp). However, unlike the light source of the conventional lamp, which can only be operated as a whole, the arrangement of the LEDs 1 in LED groups 11, 12 may allow creating a large variety of different beam patterns optimized for specific driving situations. FIGS. 5A and 5B, like FIG. 2, show two possible examples of two LED groups 11, 12 generating a motorway beam 40 and a city beam 41. For doing so, LED group 11 may comprise the uppermost 4 LEDs 1 (the 4 LEDs 1 most distant from a base of the LED retrofit 1) and, thus, may form a reflector neck of the vehicle light. In the same way, LED group 12 may comprise 3 LEDs 1 closer to the base (the LEDs in rows 3 through 5 when numbering the LEDs from 1 through 6 starting from the uppermost LED (e.g., from the LED most distant from the base)).

Instead of having the 6×1 array occupying the same space as the light source of the conventional lamp, the space occupied by the array may be extended towards or away from the base or both. The light generated by the LEDs in such extended space may be useful for particularly long range and/or broad beams, such as for off-road driving or on race courses when glaring other traffic participants is not an issue.

Even more options may be available when the controller 5 may not just turn on and off the LEDs of an LED group (e.g., may not just select zero and maximum power for an LED but to operate the LEDs also at intermediate power levels). This may, for example, allow use of light of LEDs outside the space of the light source of the conventional lamp without glaring when their power level is selected to be sufficiently low. This may also allow optimizing a luminance profile of the LED retrofit lamp for a specific vehicle light. For example, while a conventional H7 halogen lamp may be used for many different headlights of various vehicle types without any possibility of adaptation, an LED retrofit for an H7 may be optimized for each vehicle type by selecting appropriate operating power levels for the LEDs in the LED groups of the LED retrofit. Such customization could, for example, be performed on manufacturing the LED retrofit, could be customized by the trader when selling the LED retrofit, or could be selected by the end user, such as via a function of the previously discussed smartphone application.

With one-dimensional arrays of LEDs 1 like the 6×1 array of FIG. 5A and FIG. 5B closely mimicking the extension of the light source of the conventional lamp to be replaced, such LED retrofits may be particularly useful as conventional lamp replacements. Their beam shape may be particularly suited for staying within legal boundaries whereas selectively operating the various LED groups and selecting their operating power may allow a large variety of added functionality over the base lighting functionality of the conventional lamp. Besides the motorway and city beams, many other beam shapes may be designed, such as adverse weather beams, country side beams and welcome lights. Besides high-power LEDs for long range beams, mid-power LEDs may be used, for example, for parking lights and welcome patterns.

Figure 6:
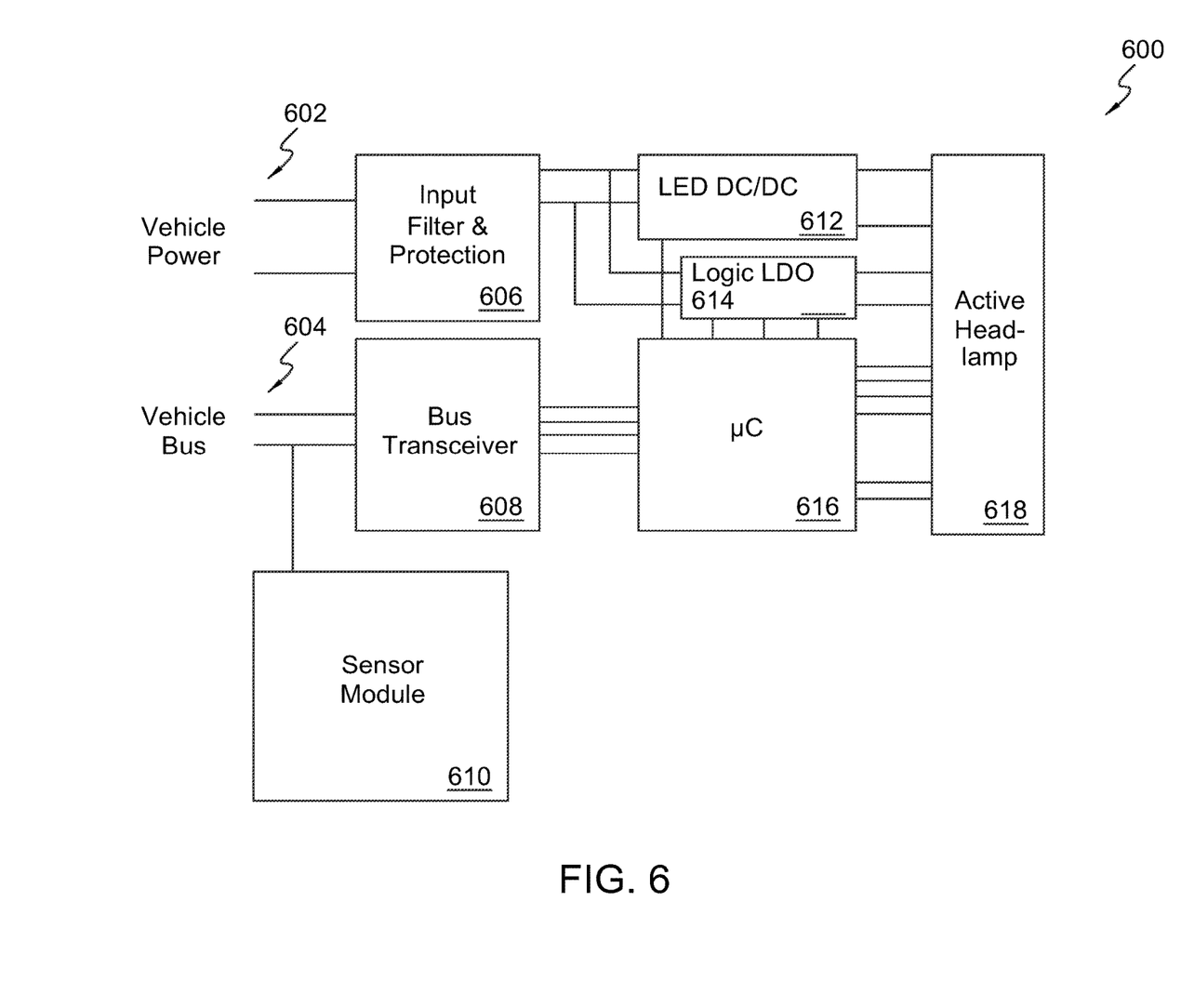
FIG. 6 is a diagram of an example vehicle headlamp system.

FIG. 6 is a diagram of an example vehicle headlamp system 600 that may incorporate one or more of the embodiments and examples described herein. The example vehicle headlamp system 600 illustrated in FIG. 6 includes power lines 602, a data bus 604, an input filter and protection module 606, a bus transceiver 608, a sensor module 610, an LED direct current to direct current (DC/DC) module 612, a logic low-dropout (LDO) module 614, a micro-controller 616 and an active head lamp 618.

The power lines 602 may have inputs that receive power from a vehicle, and the data bus 604 may have inputs/outputs over which data may be exchanged between the vehicle and the vehicle headlamp system 600. For example, the vehicle headlamp system 600 may receive instructions from other locations in the vehicle, such as instructions to turn on turn signaling or turn on headlamps, and may send feedback to other locations in the vehicle if desired. The sensor module 610 may be communicatively coupled to the data bus 604 and may provide additional data to the vehicle headlamp system 600 or other locations in the vehicle related to, for example, environmental conditions (e.g., time of day, rain, fog, or ambient light levels), vehicle state (e.g., parked, in-motion, speed of motion, or direction of motion), and presence/position of other objects (e.g., vehicles or pedestrians). A headlamp controller that is separate from any vehicle controller communicatively coupled to the vehicle data bus may also be included in the vehicle headlamp system 600. In FIG. 6, the headlamp controller may be a micro-controller, such as micro-controller (μc) 616. The micro-controller 616 may be communicatively coupled to the data bus 604.

The input filter and protection module 606 may be electrically coupled to the power lines 602 and may, for example, support various filters to reduce conducted emissions and provide power immunity. Additionally, the input filter and protection module 606 may provide electrostatic discharge (ESD) protection, load-dump protection, alternator field decay protection, and/or reverse polarity protection.

The LED DC/DC module 612 may be coupled between the input filter and protection module 606 and the active headlamp 618 to receive filtered power and provide a drive current to power LEDs in the LED array in the active headlamp 618. The LED DC/DC module 612 may have an input voltage between 7 and 18 volts with a nominal voltage of approximately 13.2 volts and an output voltage that may be slightly higher (e.g., 0.3 volts) than a maximum voltage for the LED array (e.g., as determined by factor or local calibration and operating condition adjustments due to load, temperature or other factors).

The logic LDO module 614 may be coupled to the input filter and protection module 606 to receive the filtered power. The logic LDO module 614 may also be coupled to the micro-controller 616 and the active headlamp 618 to provide power to the micro-controller 616 and/or electronics in the active headlamp 618, such as CMOS logic.

The bus transceiver 608 may have, for example, a universal asynchronous receiver transmitter (UART) or serial peripheral interface (SPI) interface and may be coupled to the micro-controller 616. The micro-controller 616 may translate vehicle input based on, or including, data from the sensor module 610. The translated vehicle input may include a video signal that is transferrable to an image buffer in the active headlamp 618. In addition, the micro-controller 616 may load default image frames and test for open/short pixels during startup. In embodiments, an SPI interface may load an image buffer in CMOS. Image frames may be full frame, differential or partial frames. Other features of micro-controller 616 may include control interface monitoring of CMOS status, including die temperature, as well as logic LDO output. In embodiments, LED DC/DC output may be dynamically controlled to minimize headroom. In addition to providing image frame data, other headlamp functions, such as complementary use in conjunction with side marker or turn signal lights, and/or activation of daytime running lights, may also be controlled.

Figure 7:
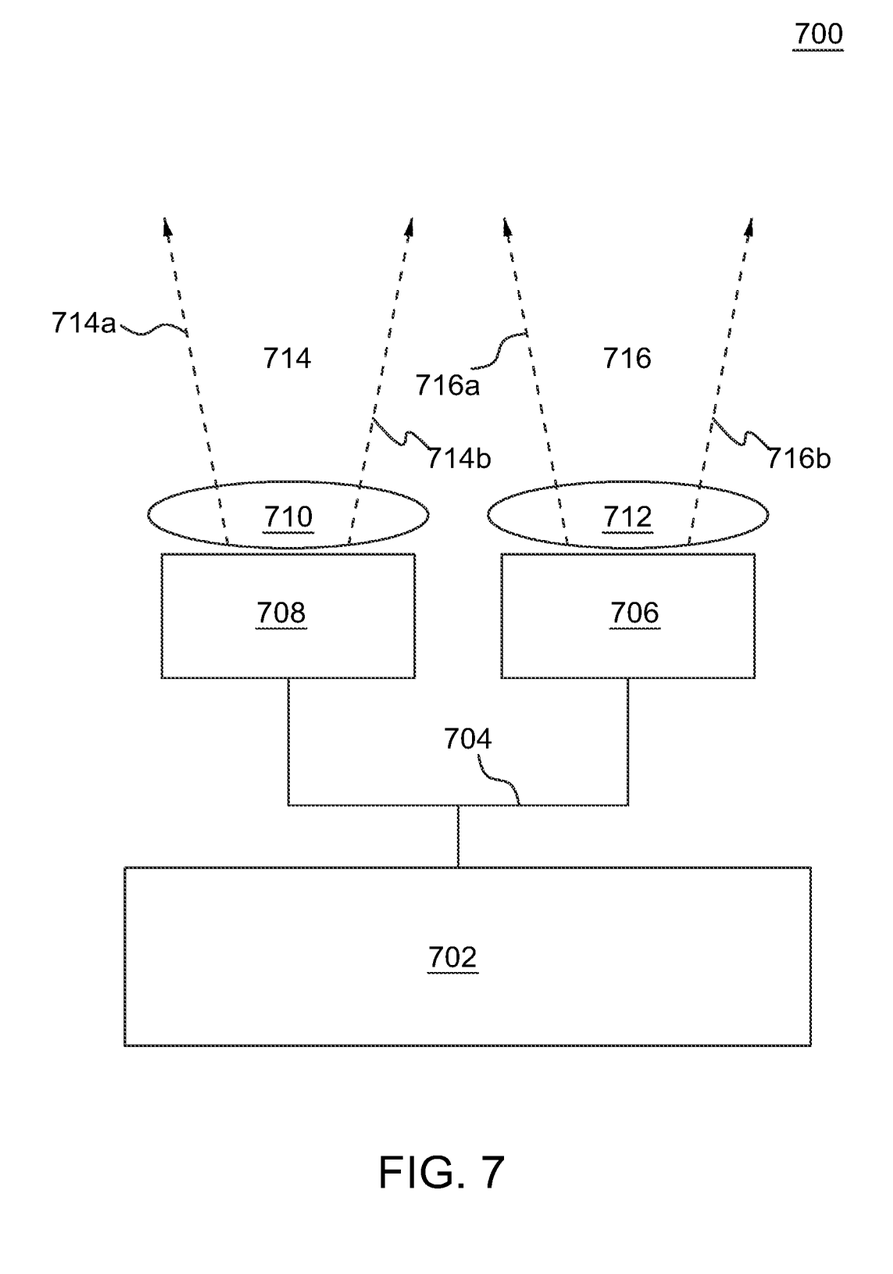
FIG. 7 is a diagram of another example vehicle headlamp system.

FIG. 7 is a diagram of another example vehicle headlamp system 800. The example vehicle headlamp system 700 illustrated in FIG. 7 includes an application platform 702, two LED lighting systems 706 and 708, and secondary optics 710 and 712.

The LED lighting system 708 may emit light beams 714 (shown between arrows 714a and 714b in FIG. 7). The LED lighting system 706 may emit light beams 716 (shown between arrows 716a and 716b in FIG. 7). In the embodiment shown in FIG. 7, a secondary optic 710 is adjacent the LED lighting system 708, and the light emitted from the LED lighting system 708 passes through the secondary optic 710. Similarly, a secondary optic 712 is adjacent the LED lighting system 706, and the light emitted from the LED lighting system 706 passes through the secondary optic 712. In alternative embodiments, no secondary optics 710/712 are provided in the vehicle headlamp system.

Where included, the secondary optics 710/712 may be or include one or more light guides. The one or more light guides may be edge lit or may have an interior opening that defines an interior edge of the light guide. LED lighting systems 708 and 706 may be inserted in the interior openings of the one or more light guides such that they inject light into the interior edge (interior opening light guide) or exterior edge (edge lit light guide) of the one or more light guides. In embodiments, the one or more light guides may shape the light emitted by the LED lighting systems 708 and 706 in a desired manner, such as, for example, with a gradient, a chamfered distribution, a narrow distribution, a wide distribution, or an angular distribution.

The application platform 702 may provide power and/or data to the LED lighting systems 706 and/or 808 via lines 704, which may include one or more or a portion of the power lines 602 and the data bus 604 of FIG. 6. One or more sensors (which may be the sensors in the vehicle headlamp system 700 or other additional sensors) may be internal or external to the housing of the application platform 702. Alternatively, or in addition, as shown in the example vehicle headlamp system 600 of FIG. 6, each LED lighting system 708 and 706 may include its own sensor module, connectivity and control module, power module, and/or LED array.

In embodiments, the vehicle headlamp system 700 may represent an automobile with steerable light beams where LEDs may be selectively activated to provide steerable light. For example, an array of LEDs or emitters may be used to define or project a shape or pattern or illuminate only selected sections of a roadway. In an example embodiment, infrared cameras or detector pixels within LED lighting systems 706 and 708 may be sensors (e.g., similar to sensors in the sensor module 610 of FIG. 6) that identify portions of a scene (e.g., roadway or pedestrian crossing) that require illumination.

Figure 8:
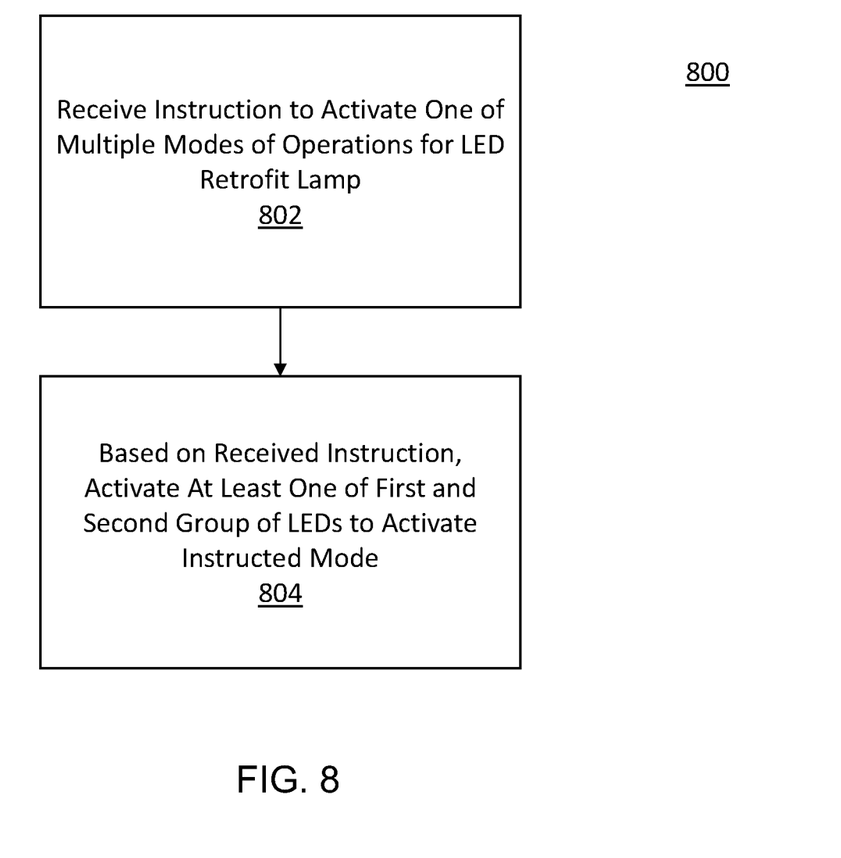
FIG. 8 is a flow diagram of an example method of operating an LED retrofit lamp, such as any of the lamps shown in FIGS. 2A, 2B, 4A, 4B, 5A and/or 5B.

FIG. 8 is a flow diagram of an example method 800 of operating an LED retrofit lamp, such as any of the lamps shown in FIGS. 2A, 2B, 4A, 4B, 5A and/or 5B. In the example illustrated in FIG. 8, an instruction may be received to activate one of multiple different modes of operation for the LED retrofit lamp (802). In embodiments, the method may be executed by a mobile device, such as a smart phone, running an application associated with the LED retrofit lamp. Based on the received instruction, activating at least one of a first group of LEDs or a second group of LEDs in the LED retrofit lamp to activate the one of the plurality of different modes of operation (804).

In some embodiments, the LEDs in the first and second groups may have different luminances, with one of the groups being a high luminance group having a luminance above 100 Mcd/m². For example, the first group of LEDs may be configured to generate a high beam when activated, the second group of LEDs may be configured to generate an extension of the high beam when activated, and the instruction may be to activate an extended beam mode. In such situation, both the first and second groups of LEDs may be activated based on the received instruction. Sometimes, the first group may already be activated and the user may instruct the extended beam mode (e.g., by interacting with a display screen). In such situation, the controller may activate only the second group as the first group is already on. Similarly, if the user instructs high beam mode only, the controller may activate only one of the groups of LEDs, such as the first group.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Having described the embodiments in detail, those skilled in the art will appreciate that, given the present description, modifications may be made to the embodiments described herein without departing from the spirit of the inventive concept. Therefore, it is not intended that the scope of the invention be limited to the specific embodiments illustrated and described.

What is claimed is:

1. An LED retrofit lamp comprising:
    a substrate comprising a first surface and a second surface opposite the first surface;
    an array of LEDs on the first surface of the substrate, wherein a first subset of the LEDs in the array defines a first beam shape and a second subset of the LEDs in the array defines a second beam shape;
    power contacts configured to receive electrical power to operate the LEDs;
    an interface configured to supply control signals to select the first beam shape or the second beam shape; and
    a single controller on the substrate, wherein the single controller on the substrate is configured to receive the control signals and, based on the received control signals, power on only the LEDs in the array that are in the first subset.

2. The LED retrofit lamp according to claim 1, wherein the first subset and the second subset are disjunct.

3. The LED retrofit lamp according to claim 2, wherein the first beam shape is a high beam shape and the second beam shape is an extension of the high beam.

4. The LED retrofit lamp according to claim 3, wherein the LEDs of the second subset have a luminance greater than 100 Mcd/m².

5. The LED retrofit lamp according to claim 4, wherein the LEDs of the first subset have a luminance less than 100 Mcd/m².

6. The LED retrofit lamp according to claim 1, wherein the first subset and the second subset overlap.

7. The LED retrofit lamp according to claim 1, wherein:
    the interface comprises the power contacts,
    the control signals comprise sequences of powering on and powering off the power contacts, and
    the single controller on the substrate is further configured to interpret the sequence as the control signals.

8. The LED retrofit lamp according to claim 1, wherein the interface is configured to receive user control signals via radio.

9. The LED retrofit lamp according to claim 1, wherein:
    the array of LEDs comprises 5 rows and 3 columns of LEDs,
    the first subset of LEDs comprises all LEDs in a second one of the 3 columns, and
    the second subset of LEDs comprises all LEDs in the second, third, and fourth rows of the 5 rows.

10. The LED retrofit lamp according to claim 1, wherein the array of LEDs comprises a single column of LEDs.

11. The LED retrofit lamp according to claim 10, wherein when the LED retrofit lamp is installed in place of a conventional lamp in a vehicle light, the array occupies the same space in the vehicle light as a light source of the conventional lamp.

12. The LED retrofit lamp according to claim 10, wherein when the LED retrofit lamp is installed in place of a conventional lamp in a vehicle light, the array extends the space occupied by a light source of the conventional lamp in a direction towards a base of the conventional lamp, opposite to the base, or both.

13. The LED retrofit lamp according to claim 10, wherein the array comprises 6 rows of the LEDs and, starting from the row most distant from a base of the LED retrofit lamp:
    the first subset of LEDs comprises all of the LEDs in rows 1 through 4, and
    the second subset of LEDs comprises all of the LEDs in rows 3 through 5.

14. The LED retrofit lamp according to claim 1, wherein the controller is further configured to operate the first subset and the second subset of LEDs by selecting an operating power of the LEDs in one or more of the LED subsets in-between zero and maximum power.

15. The LED retrofit lamp according to claim 1, wherein the LED retrofit lamp further comprises an other array of LEDs on the second surface of the substrate, and
    wherein the single controller on the substrate is on one of the first surface or the second surface of the substrate and is configured to control both the array of LEDs and the other array of LEDs.

16. A non-transitory computer readable storage medium storing instructions for controlling an LED retrofit lamp, the instructions, when executed by a processor, cause the processor to execute a method comprising:
    receiving an instruction to activate one of a plurality of different modes of operation for the LED retrofit lamp, wherein the plurality of different modes comprise at least a first beam shape associated with at least a first subset of LEDs in an LED array and a second beam shape associated with at least a second subset of the LEDs in the LED array;

based on the received instruction, powering on only the LEDs in the array that correspond to the activated one of the plurality of different modes of operation, wherein: the first subset of LEDs is configured to generate a high beam when activated; the second subset of LEDs is configured to generate an extension of the high beam when activated; the instruction is to activate a high beam mode; and the method further comprises, based on the received instruction, activating only the first subset of LEDS.

17. The non-transitory computer readable storage medium of claim 16, wherein:

the instruction is to activate an extended beam mode, and the method further comprises:

based on the received instruction, activating both the first and second subsets of LEDs.

18. The non-transitory computer readable storage medium of claim 16, wherein the LEDs of the second subset have a luminance greater than 100 $Mcd/m^2$, and wherein the LEDs of the first subset have a luminance less than 100 $Mcd/m^2$.

19. The non-transitory computer readable storage medium of claim 16, wherein the non-transitory computer readable storage medium is on a mobile device.

* * * * *